March 5, 1963  F. G. REUTER  3,079,772
JOINT FOR UNIVERSAL-JOINT SHAFTS
Filed Feb. 23, 1961  4 Sheets-Sheet 1

Inventor:
Franz G. Reuter
By
Watson, Cole, Grindle & Watson
Attys.

March 5, 1963   F. G. REUTER   3,079,772
JOINT FOR UNIVERSAL-JOINT SHAFTS
Filed Feb. 23, 1961   4 Sheets-Sheet 2

Inventor:
Franz G. Reuter
By Watson Cole Grindle + Watson
Attys.

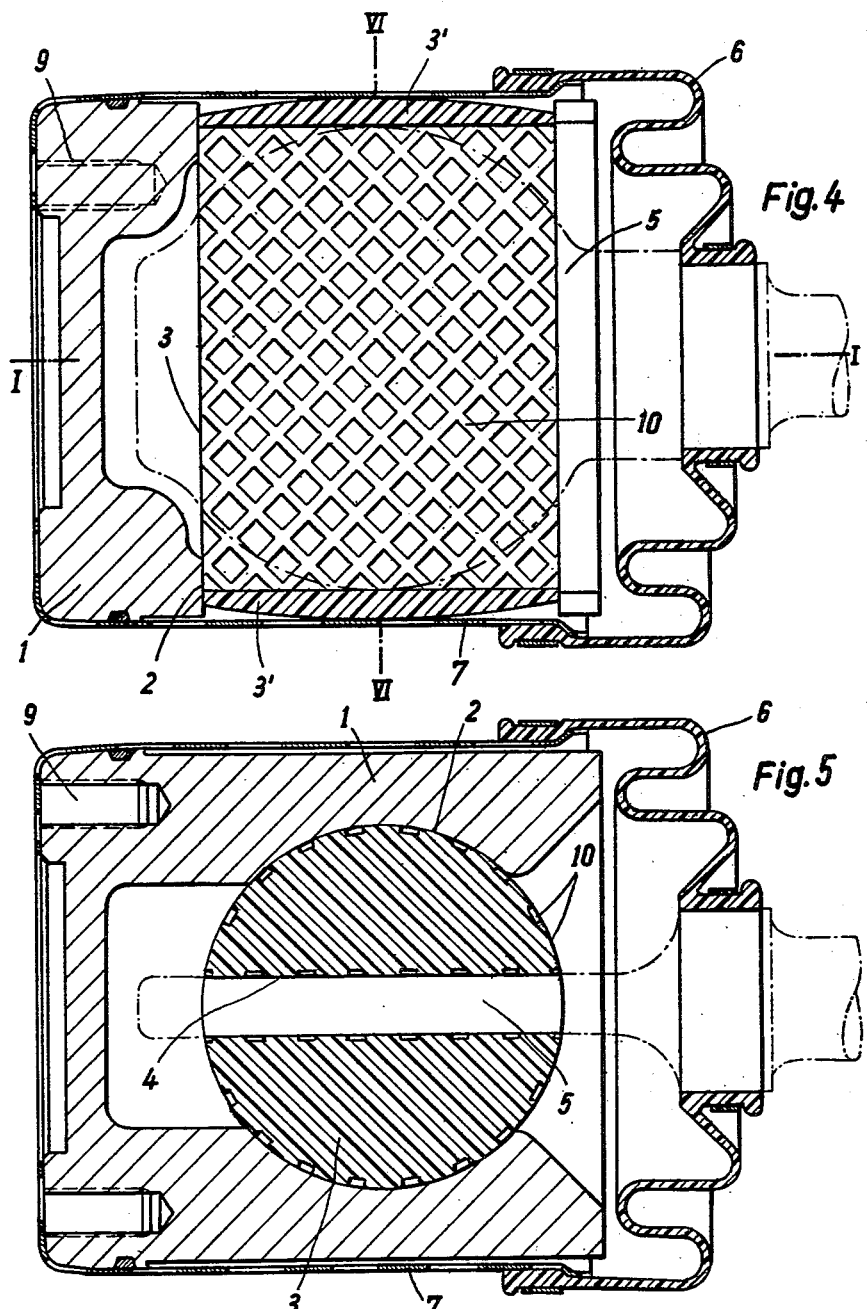

March 5, 1963    F. G. REUTER    3,079,772
JOINT FOR UNIVERSAL-JOINT SHAFTS
Filed Feb. 23, 1961    4 Sheets-Sheet 4

Inventor:
Franz G. Reuter
By Watson, Cole, Grindle & Watson
Attys.

United States Patent Office 3,079,772
Patented Mar. 5, 1963

3,079,772
JOINT FOR UNIVERSAL-JOINT SHAFTS
Franz Gottfried Reuter, Lemforde, Hannover, Germany, assignor to Lemforder Metallwarengesellschaft m.b.H., Lemforde, Hannover, Germany
Filed Feb. 23, 1961, Ser. No. 91,216
Claims priority, application Germany Feb. 22, 1960
2 Claims. (Cl. 64—8)

The object of the invention is a joint which permits two movements in directions at right angles to one another like a universal or Cardan joint, but at the same time is far superior to the known steel universal joints as regards consumption of material and machining costs.

The joint according to the invention is characterised by a cylindrical slide block made of plastic, preferably polyurethane plastic, rotatably mounted in a transverse bore in a pot-like bearing housing and having a central longitudinal slot for rotatably mounting a spoon-like extension of one of the shafts to be connected (shaft spoon), while the other shaft is flanged on to the housing at the base end thereof.

The advantage of the type of joint according to the invention resides in the first place in the small number and the simplicity of the component parts, namely the pot-like housing and the slide block. Again, the plastic slide block makes it unnecessary to machine the bearing surfaces accurately, as is otherwise absolutely essential in the case of the parts of steel joints. Furthermore, the plastic slide block gives the joint a certain elasticity which renders the transmission of movement elastic, in particular when starting. Moreover, play-free operation of the joint is ensured and, in addition, the joint does not require special maintenance.

Lateral support of the slide block in the transverse bore can be obtained by means of laterally mounted covers which at the same time seal the bearing housing so that it is oil-tight. In a preferred embodiment of the invention, however, the bearing housing is inserted in a pot-like sheet-metal casing which, with the interposition if required of arcuate segmental pieces, forms the lateral supporting surfaces for the slide block.

If, in one form of construction of the invention, the spoon shaft is not to be able to perform any longitudinal movements, the inner end faces of the longitudinal slot in the slide block are given the same curvature as the shaft spoon in the direction of said slot, so that the spoon can perform only universal-joint-like rotating movements.

In another form of construction of the invention, the inner end faces of the longitudinal slot in the slide block are left straight, that is to say they extend parallel to the longitudinal axis of the bearing housing, and this form of construction then allows, in addition, a longitudinal movement of the shaft spoon and thereby of the shaft to which the spoon is attached. In this way, a joint is created which resembles functionally the universal joints with sliding sleeves which are fitted conventionally especially in motor vehicles, which joints have the drawback that they exhibit a high degree of non-uniformity when running under deflection. Furthermore, great forces of longitudinal displacement occur in the sliding sleeves, which have a toothed profile, and in the most favourable case these forces permit only a jerky compensation of length. These drawbacks of the known universal joints comprising sliding sleeves are removed in the type of joint according to the invention.

As such joints run in oil as a rule, oil grooves are provided at the bearing and guide surfaces of the slide block and the pot-like housing is sealed by a diaphragm at the place where the spoon shaft is introduced so that the housing is oil-tight and dustproof.

Two embodiments of the object of the invention are illustrated in the drawing.

FIG. 4 is a longitudinal section through a second embodiment of the joint according to the invention on the line IV—IV of FIG. 6;

FIG. 5 is a cross-section on the line V—V of FIG. 4;

Figure 1:
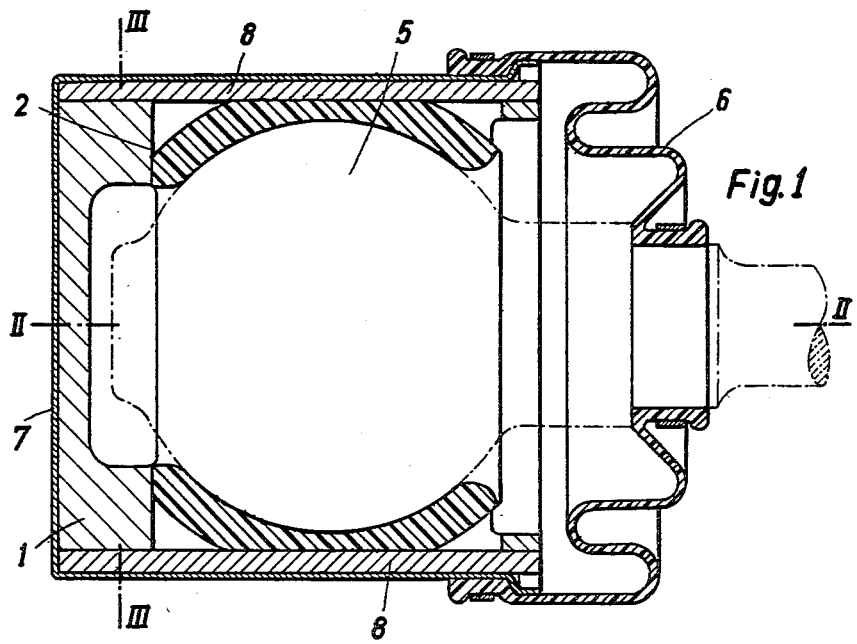
FIG. 1 is a longitudinal section through a first embodiment of the joint according to the invention on the line I—I of FIG. 3.

The joint according to the invention consists principally of a pot-like housing 1 through the wall of which there extends a through transverse bore 2 in which there is mounted a cylindrical slide block 3 made of plastic. Said slide block has a central longitudinal slot 4 in which one of the shafts to be connected engages by means of a spoon-like extension 5. The joint is covered at the rear by a diaphragm 6 and is moreover enclosed by a pot-like sheet-metal casing 7.

Figure 2:
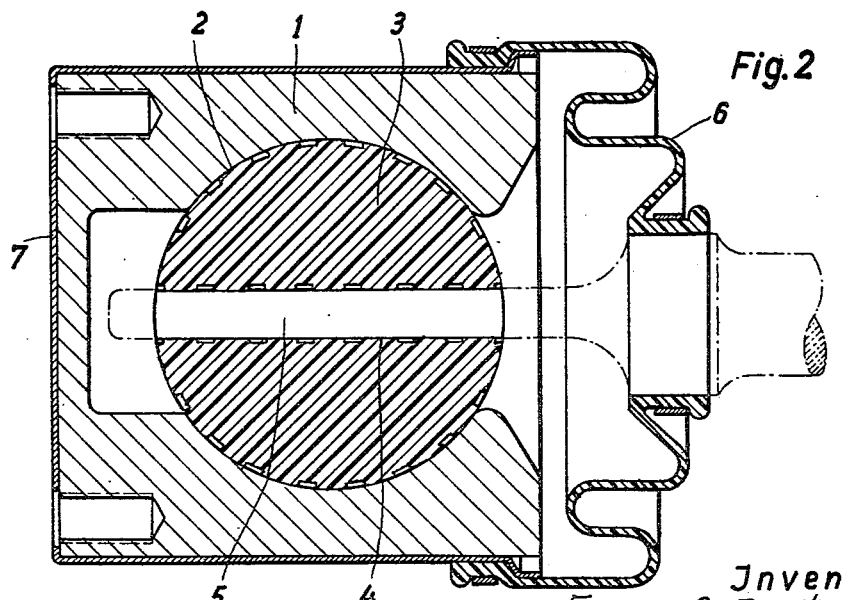
FIG. 2 is a cross-section on the line II—II of FIG. 1.
Figure 3:
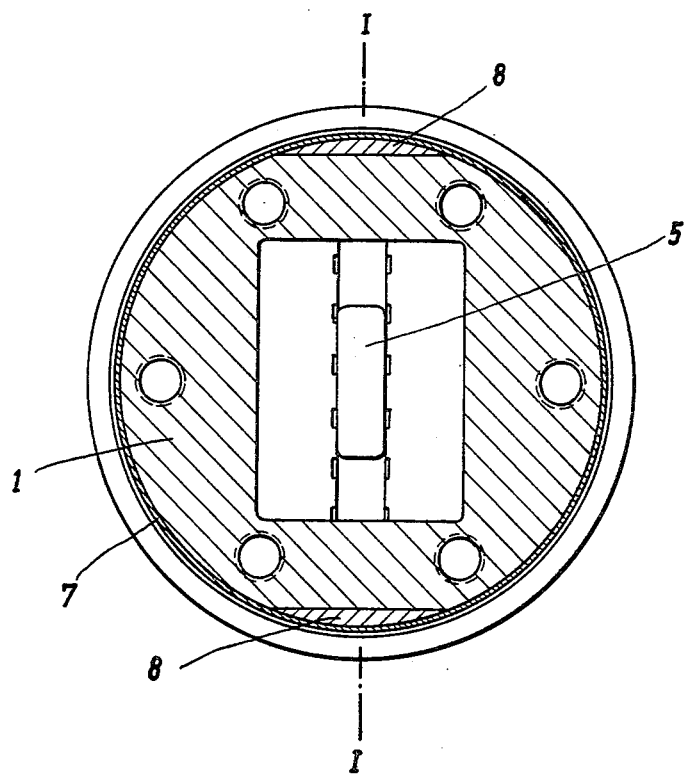
FIG. 3 is a section on the line III—III of FIG. 1.
Figure 6:
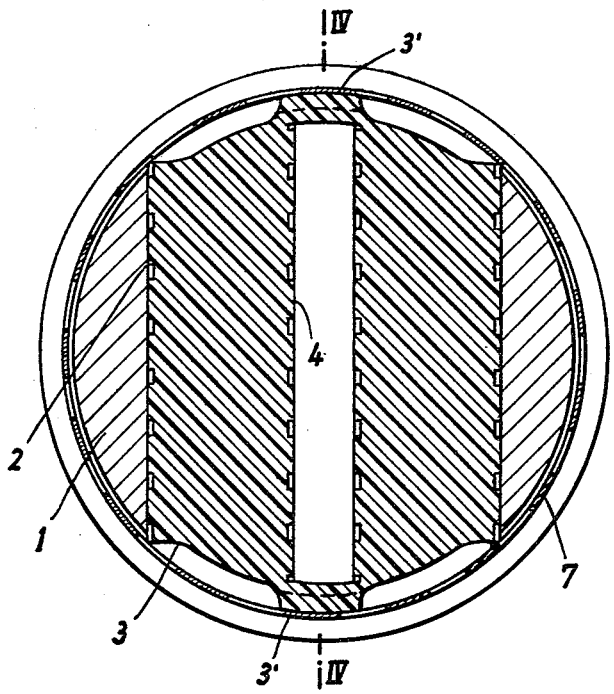
FIG. 6 is a section on the line VI—VI of FIG. 4.
Figure 7:
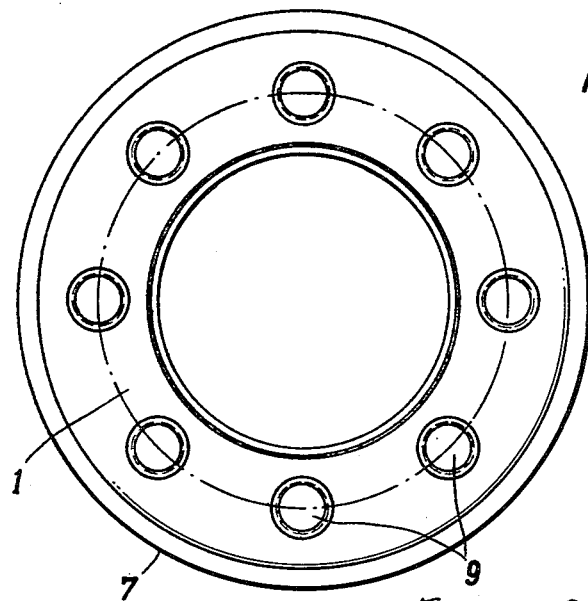
FIG. 7 is an end view as seen in the direction of the arrow A in FIG. 4.

In the embodiment according to FIGS. 1 to 3, the inner end faces of the longitudinal slot 4 let into the slide block 3 have the same curvature as the shaft spoon 5, whereby the possibility of longitudinal movement of the shaft to which the spoon is attached is prevented. Inserted segmental pieces 8 fill the intermediate spaces between the outer sheet-metal casing 7 and the flattened end faces of the slide block 3, which in this case must be divided as a rule for the purpose of introducing the spoon.

In the embodiment according to FIGS. 4 to 7, the inner end faces of the longitudinal slot 4 in the slide block 3 follow a straight path, so that the joint spoon 5 can perform longitudinal movements for the purpose of compensating the length. In this form of construction, the slide block 3 rests directly against the sheet-metal casing 7 by means of bridges 3', but a flattening on the pattern of the above-described form of construction could also be chosen just as well. Lubricating grooves 10 are provided at the sliding surfaces of the slide block.

For connecting the other shaft, tapped holes 9 are let into the base of the housing 1 and to these the connecting shaft is flanged on.

The joint according to the invention has the advantage that its component parts are simple to produce and, in particular, are also very simple to assemble. Since all friction of steel on steel is avoided, no wear phenomena worth mentioning occur. Considered as a whole, the joint forms a self-contained structural unit which can be installed in any desired shaftings.

What I claim is:

1. A universal joint interconnected to two shafts comprising a bearing housing having a transverse bore therein, a spoon-like extension projecting into the housing and the bore thereof and having side surfaces and a peripheral edge surface, and a unitary cylindrical slide block of an elastic plastic material provided in the bore of the housing and having a longitudinal slot therein into which the extension extends to contact the side and edge surfaces of the extension, said extension being connected to one shaft and the housing being connectable to the other shaft.

2. A universal joint according to claim 1, in which a sheet metal casing is provided around the housing.

References Cited in the file of this patent

UNITED STATES PATENTS

| | | |
|---|---|---|
| 849,384 | Gault | Apr. 9, 1907 |
| 1,907,833 | Kurtze | May 9, 1933 |
| 2,308,073 | Hagerty | Jan. 12, 1943 |
| 2,386,630 | O'Malley | Oct. 9, 1945 |
| 2,841,967 | Baker | July 8, 1958 |